(12) United States Patent
Kingman et al.

(10) Patent No.: US 7,847,444 B2
(45) Date of Patent: Dec. 7, 2010

(54) ELECTRIC MOTOR ASSEMBLY WITH STATOR MOUNTED IN VEHICLE POWERTRAIN HOUSING AND METHOD

(75) Inventors: Grantland I. Kingman, Waterford, MI (US); Alan G. Holmes, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/325,675

(22) Filed: Dec. 1, 2008

(65) Prior Publication Data

US 2009/0212649 A1    Aug. 27, 2009

Related U.S. Application Data

(60) Provisional application No. 61/031,482, filed on Feb. 26, 2008.

(51) Int. Cl.
| | |
|---|---|
| H02K 5/24 | (2006.01) |
| H02K 5/00 | (2006.01) |
| H02K 1/06 | (2006.01) |
| H02K 1/12 | (2006.01) |

(52) U.S. Cl. .............. 310/51; 310/91; 310/216.129; 310/254; 310/433

(58) Field of Classification Search ............ 310/91, 310/216.129, 217, 414, 254, 258–259
See application file for complete search history.

(56) References Cited

U.S. PATENT DOCUMENTS

| | | | | |
|---|---|---|---|---|
| 2,282,586 A | * | 5/1942 | Hubacker | 310/86 |
| 2,977,491 A | * | 3/1961 | Hueffed et al. | 310/259 |
| 5,423,235 A | * | 6/1995 | Botterill et al. | 74/665 GA |
| 5,585,682 A | * | 12/1996 | Konicek et al. | 310/89 |
| 6,472,780 B2 | * | 10/2002 | Kikuchi et al. | 310/52 |
| 2001/0038797 A1 | * | 11/2001 | Makino et al. | 417/410.1 |
| 2002/0067086 A1 | * | 6/2002 | Kikuchi et al. | 310/54 |
| 2002/0135244 A1 | * | 9/2002 | Strong et al. | 310/51 |
| 2006/0220474 A1 | * | 10/2006 | Yoshida | 310/43 |
| 2006/0289209 A1 | * | 12/2006 | Grosspietsch et al. | 180/65.2 |

FOREIGN PATENT DOCUMENTS

| | | | |
|---|---|---|---|
| DE | 10261617 A1 | * | 7/2004 |
| JP | 2002107651 A | * | 4/2002 |
| JP | 2006166554 A | * | 6/2006 |

OTHER PUBLICATIONS

Machine Translation on JP2006166554(2006) and JP2002107651 (2002).*
Machine Translation DE10261617 (2004).*

* cited by examiner

*Primary Examiner*—Quyen Leung
*Assistant Examiner*—Jose A Gonzalez Quinones
(74) *Attorney, Agent, or Firm*—Quinn Law Group, PLLC

(57) ABSTRACT

An electric motor assembly in a vehicle powertrain is provided with a generally annular stator fit within an interior cavity of the powertrain defined by a housing. Roll pins are fit between the housing and the stator. The stator may have a plurality of first geometric features and the housing a plurality of second geometric features. The first geometric features are be configured to align with the second geometric features when the stator is fit within the cavity, with the roll pins fit between the housing and the stator at the aligned first and second geometric features. A method of assembling the electric motor assembly is also provided.

10 Claims, 4 Drawing Sheets

ELECTRIC MOTOR ASSEMBLY WITH STATOR MOUNTED IN VEHICLE POWERTRAIN HOUSING AND METHOD

CROSS-REFERENCE TO RELATED APPLICATIONS

This application claims the benefit of U.S. Provisional Application 61/031,482, filed Feb. 26, 2008, which is hereby incorporated by reference in its entirety.

TECHNICAL FIELD

The invention relates to an electric motor assembly and a method of assembling an electric motor in a vehicle powertrain; specifically, an electric motor stator fit within a vehicle powertrain housing with roll pins therebetween.

BACKGROUND OF THE INVENTION

Electric motors, such as those typically used in hybrid electromechanical powertrains for automotive vehicles, have a stator surrounding a rotor that is rotatable relative to the stator. The stator is grounded to a stationary member, such as a transmission housing or casing. It is important that the relative positions of the stator and rotor remain substantially constant in order to preserve a precisely sized gap between the stator and rotor. This is of special difficulty in the case of a vehicle transmission or other powertrain component, because the electric motor may be subjected to extreme vibration and mechanical shock from the travel of the vehicle over bumps or other rough terrain. The stator is grounded to the transmission casing by any of a number of methods, such as bolting or slip-fitting. The stator must maintain its position relative to the housing, both axially and radially, when the housing and/or stator expand and contract due to thermal variations. Stators are steel, as they must generate an electromagnetic field when energized in order to move the rotor. Housings may be of a different, non-ferrous material, such as an aluminum alloy or plastic, with a greater coefficient of thermal expansion than steel.

SUMMARY OF THE INVENTION

Differences in rates of thermal expansion among different materials used for a stator and a powertrain housing can cause a misalignment of the stator and rotor of an electric motor included in the powertrain. An inexpensive solution is provided to prevent relative motion between the stator and the housing. Specifically, an electric motor assembly in a vehicle powertrain is provided with a generally annular stator fit within an interior cavity defined by the motor housing. Roll pins are fit between the housing and the stator. Roll pins, sometimes referred to as spring pins, are elongated, generally cylindrical pins that may be compressed radially and are biased to maintain a radially-outward spring force. Thus, when the roll pins are fit between the housing and stator, as differences in rates of thermal expansion cause a gap of varying size between the stator and housing, the roll pins will expand and contract as necessary to maintain contact with the stator and housing at least over a predetermined gap distance.

The stator has a plurality of first geometric features and the housing has a plurality of second geometric features. The first geometric features are configured to align radially with the second geometric features when the stator is fit within the cavity. The roll pins are fit between the housing and the stator at the aligned first and second geometric features. The first and second geometric features may be stamped, cast, molded, broached, milled, or otherwise provided at the outer surface of the stator and an inner surface of the housing, respectively. The geometric features are arranged such that the forces across the roll pins from the stator to the housing and vice versa are essentially perpendicular either to the radial growth in the housing relative to the stator or to the main mechanical forces imposed by vibration and mechanical shock.

Accordingly, a method of assembling an electric motor into a housing within a vehicle powertrain includes configuring an annular stator with a plurality of first geometric features on an outer surface of the stator, and configuring the housing with a plurality of second geometric features on an inner surface of the housing. The method requires aligning the first geometric features with the second geometric features and press-fitting the annular stator into the housing. The roll pins are inserted between the stator and the housing at the aligned features.

Other solutions to the problem of difference in rates of expansion in a hybrid transmission have included providing a separate motor housing that fits within the transmission housing, the motor housing being of the same material as the stator so that the stator is secured to the motor housing rather than the transmission casing. The roll pins and geometric features used herein are relatively inexpensive, and offer a lower cost solution than such a separate motor housing. Additionally, the geometric features discussed herein maintain a compact overall diameter of the electric motor assembly and, therefore, of the overall diameter of the transmission, so that the transmission may fit into a packaging space in a vehicle designed for a conventional automatic transmission.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
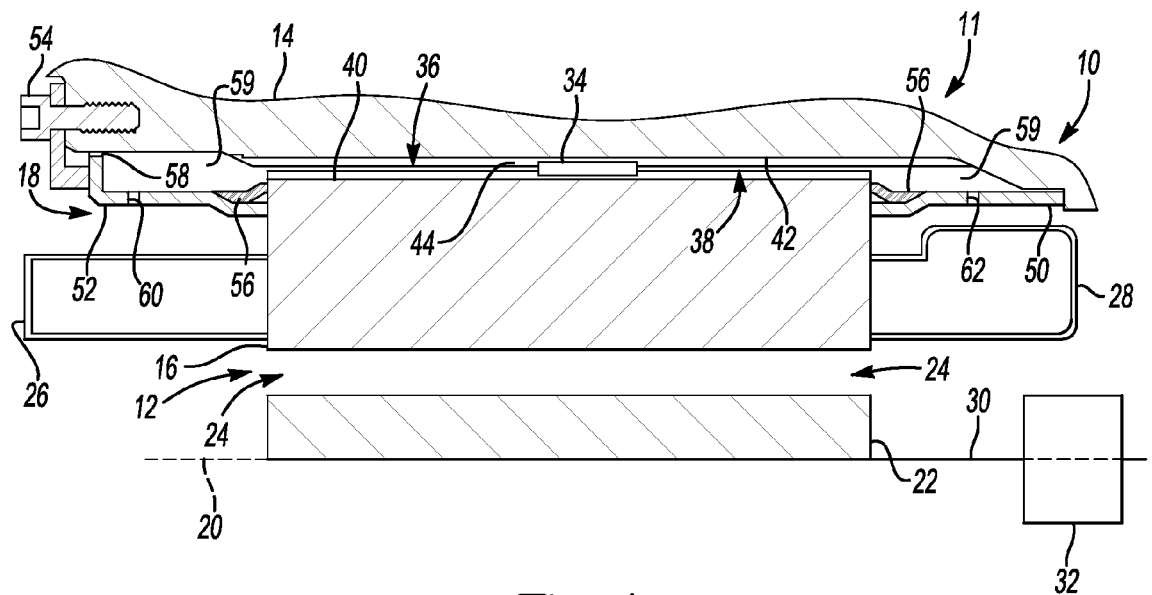
FIG. 1 is a schematic illustration in cross-sectional side view of a first embodiment of an electric motor assembly of an electrically-variable hybrid powertrain illustrating a portion of a stator secured to a transmission housing.

Referring to the drawings, wherein like reference numbers refer to like components, FIG. 1 shows a portion of an electrically-variable transmission 10 of a hybrid powertrain 11 that includes an electric motor assembly 12. The electric motor assembly 12 includes a housing 14, which in this case serves as both the motor housing and a transmission housing or casing. A transmission housing or casing houses the transmission gearing arrangement, such as transmission gearing arrangement 32 described below, as well as the motor assembly, unlike a separate motor housing which only houses a stator and rotor. The electric motor assembly 12 includes a generally annular steel stator 16 that is press-fit within an interior cavity 18 defined by the housing 14. Specifically, the stator 16 is a glued stack of punched silicon steel laminations. The stator 16 and housing 14 are shown in partial view, above an axis of rotation 20 of the transmission 10. Those skilled in the art will readily understand that the stator 16 and housing 14 are generally concentric about the axis of rotation 20. The housing 14 is a non-ferrous material, such as plastic or an aluminum or magnesium alloy, in order to minimize the weight of the assembly and to prevent electric and magnetic flow from the stator 16 to the housing 14. A rotor 22, also shown in fragmentary view only, is concentric about the centerline 20 as well, and is driven by the stator 16 by a magnetic flux from the energized stator 16 partly existing within a gap 24 defined between the rotor 22 and stator 16. The rotor 22 is driven when electric power is provided to stator coils 26, 28 that run through the stator 16 and are powered by a power source such as a battery or fuel cell (not shown). The rotor 22 is connected by a connecting member 30 to a transmission gearing arrangement 32. An engine or other power source (not shown) is also drivingly connected to the transmission gearing arrangement 32, such that the transmission 10 is a hybrid electromechanical transmission.

In order to ensure a stable fit between the stator 14 and the housing 14 to prevent relative rotation, roll pins 34 (one shown) are fit between the stator 16 and housing 14 spaced about an outer peripheral surface 36 of the stator 16 and an inner peripheral surface 38 of the housing. Specifically, a first set of geometric features in the form of grooves 40 (one shown) are stamped or pressed into the outer surface 36 of the stator 16. The grooves 40 align with a second set of geometric features in the form of complementary grooves 42 (one shown) that are molded, broached or milled at the inner surface 38 (i.e., the housing bore) of the housing 14. The grooves 40 are aligned with the similarly spaced grooves 42 when the stator 16 is slip-fit into the cavity 18 in a direction along the axis of rotation 20. The aligned grooves 40, 42 define small cavities 44 (one shown) that are sized to support the roll pins 34. The roll pins 34 are inserted into the cavities 44 between the housing 14 and stator 16 as the stator 16 is slip-fit into the housing 14.

Figure 2:
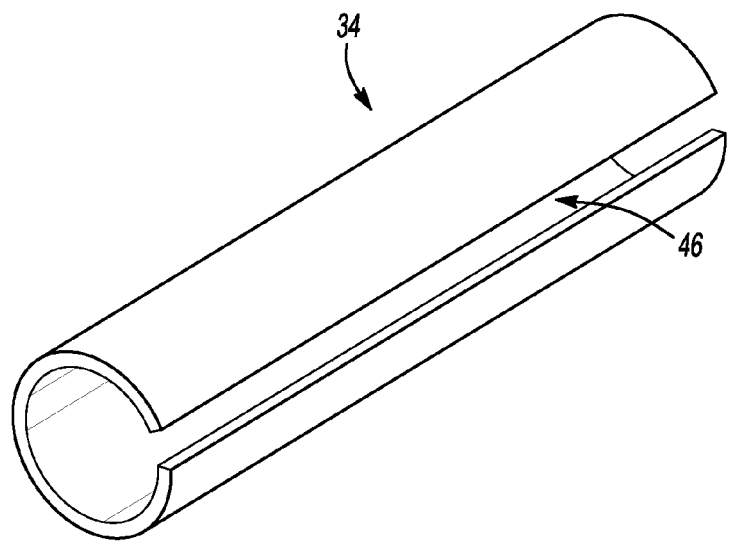
FIG. 2 is a schematic perspective illustration of a roll pin used in the embodiment of FIG. 1.

Referring to FIG. 2, one roll pin 34 is shown in greater detail. The roll pin 34 is a slotted roll pin, formed as an elongated, generally cylindrical steel pin with a lengthwise slot 46. The roll pin 34 is a single-turned, hollow design, and provides an outward biased force when compressed. The roll pin 34 is sized so that, when inserted between the housing 14 and stator 16 during assembly, it radially compresses a predetermined amount. Given expected temperature fluctuations in the environment of the transmission 10 during expected use, the roll pin 34 is configured with a diameter under zero stress and a known spring constant such that the roll pin 34 will expand to maintain contact with both the stator 16 and the housing 14 as the stator 16 and the housing 14 expand at different rates to vary the radial width of the cavity 18. Such expansion is shown with respect to roll pins 134 of FIGS. 3 and 6, as discussed below. Other forms of roll pins, such as coiled roll pins, may be used in lieu of slotted roll pins.

The cavities 44 may serve as conduits for cooling oil flow over the outer surface of the stator. A sealed oil chamber 59 is formed between the housing 14 and the stator 16 by stator supports 50, 52 that abut the housing 14, with stator support 52 being secured to the housing 14 with one or more bolts 54. Various lip seals 56 and compression seals 58 maintain the chamber 59 formed between the housing 14 and stator 16. The stator supports 50, 52 are formed with circumferential openings 60, 62 (one of each shown) through which fluid in the chamber 59 is dispersed onto the stator coils 26, 28 to cool the coils 26, 28.

Figure 3:
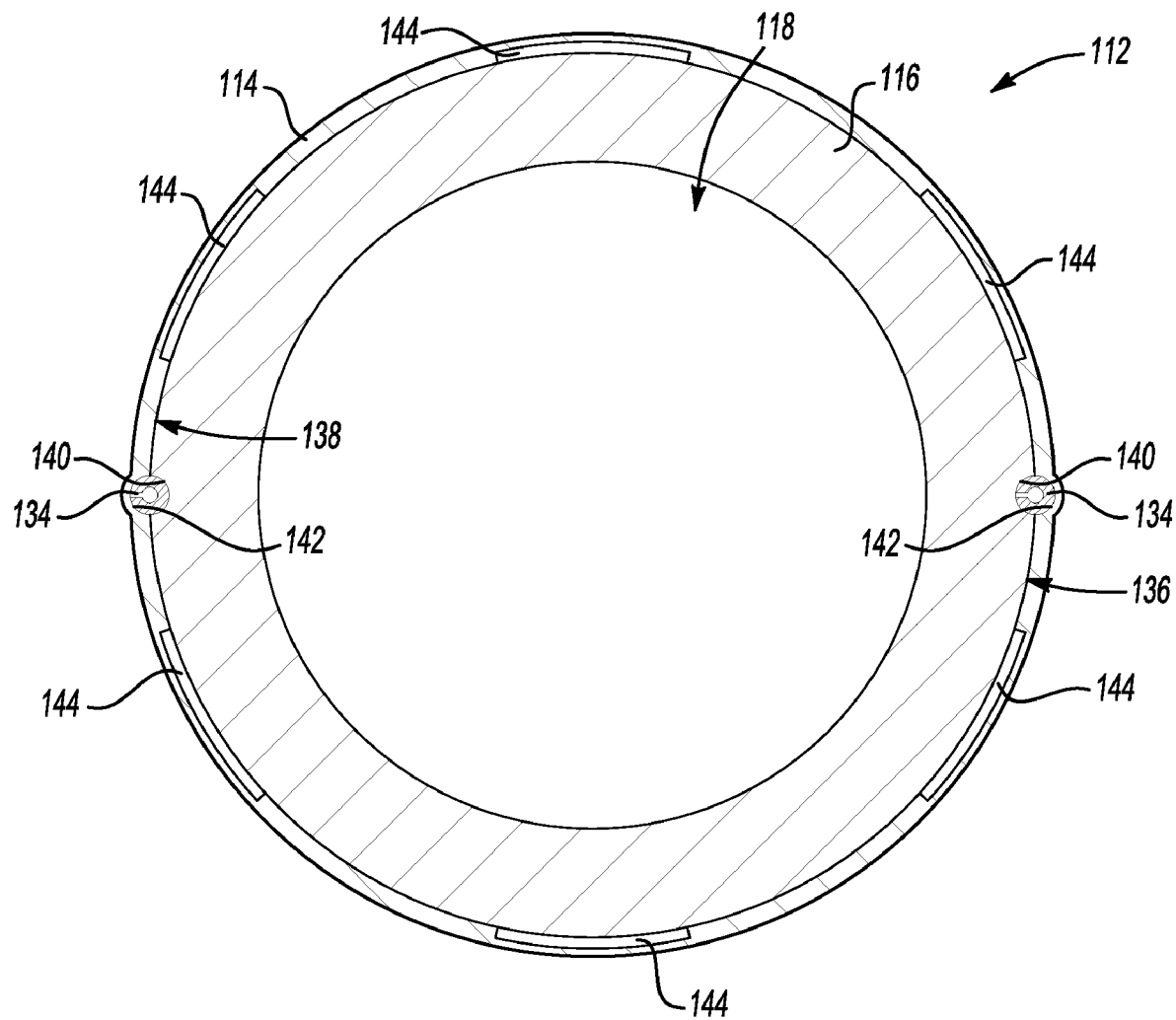
FIG. 3 is a schematic illustration in cross-sectional end view of a second embodiment of an electric motor assembly.
Figure 6:
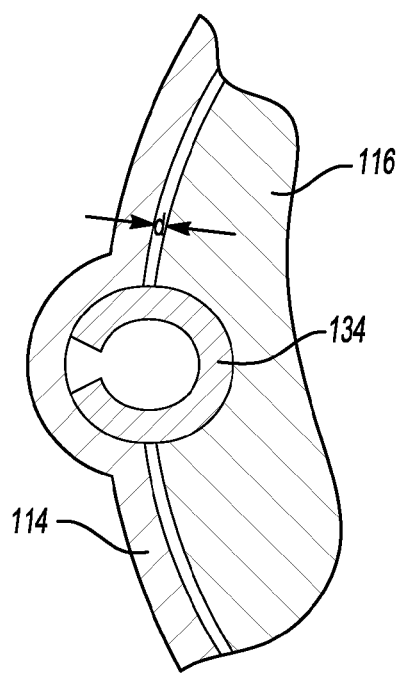
FIG. 6 is a schematic fragmentary illustration in cross-sectional view of a portion of the motor assembly of FIG. 3 under a state of thermal expansion.

Various embodiments of geometric features may be used to retain roll pins between a stator and a housing. For example, referring to FIG. 3, in another embodiment of an electric motor assembly 112, a stator 116 is slip-fit within an interior cavity 118 of a motor housing 114, which is also a transmission housing. The stator 116 is a glued stack of punched silicon steel laminations. The rotor is not shown, but would be within the cavity 118, radially inward of the stator 116, with a gap therebetween. The motor housing 114 is a die cast aluminum alloy or, alternatively, magnesium alloy or plastic. Pockets or slots 144 are cast into the housing 114 to allow cooling oil flow along an outer surface 136 of the stator 116. The stator 116 is provided with a first set of geometric features in the form of half-round notches 140 stamped or pressed into the outer surface 136 of the stator 116. Likewise, the housing 114 is provided with a second set of features in the form of half-round notches 142 broached or milled at the inner surface 138 (i.e., the inner bore) of the housing 114. The stator 116 is press-fit into the housing 114 so that the notches 140, 142 are aligned, with roll pins 134 inserted between the housing 114 and stator 116 into small cavities formed at the aligned notches 140, 142. Any type of roll pin may be used, with the roll pins 134 characterized by a size and a spring force that enable the pins 134 to maintain contact with the housing 114 and stator 116 over the expected range of thermal expansion. For example, as shown in FIG. 3, the roll pins 134 are compressed and in contact with both the housing 114 and the stator 116 when the motor assembly 112 is under a first operating temperature. Referring to FIG. 6, under a second, higher operating temperature, the stator 116 and the housing 114 have expanded at different rates such that a gap distance d has developed between the stator 116 and the housing 114. The spring force biases the roll pin 134 outward to an expanded shape shown in FIG. 6, in which the roll pin 134 maintains contact with the stator and the housing 114. When the operating temperature decreases, the stator 116 and housing 114 will decrease in size and the gap distance d will be eliminated, with the roll pin 134 returning to the shape shown in FIG. 3. The roll pin 134 is configured to maintain contact with the stator 116 and housing 114 at least over a difference in thermal expansion that results in the gap distance d.

The roll pins 134 shown in this embodiment are located on the sides of the housing 114 and stator 116, so that a line from the center of contact of the pin with the housing to the center of contact of the pin with the stator is essentially horizontal. Thus, the forces from the weight of the stator 116 and from mechanical shock when the vehicle containing the housing 114 and stator 116 traverses rough ground are primarily in an essentially perpendicular direction to the contact force between the roll pins 134 and the stator 116 and housing 114. That is, the roll pins 134 act to center the stator 116 in the housing 114, while direct contact between the housing 114 and stator 116 is able to support the greatest mechanical loads on the stator 116.

Figure 4:
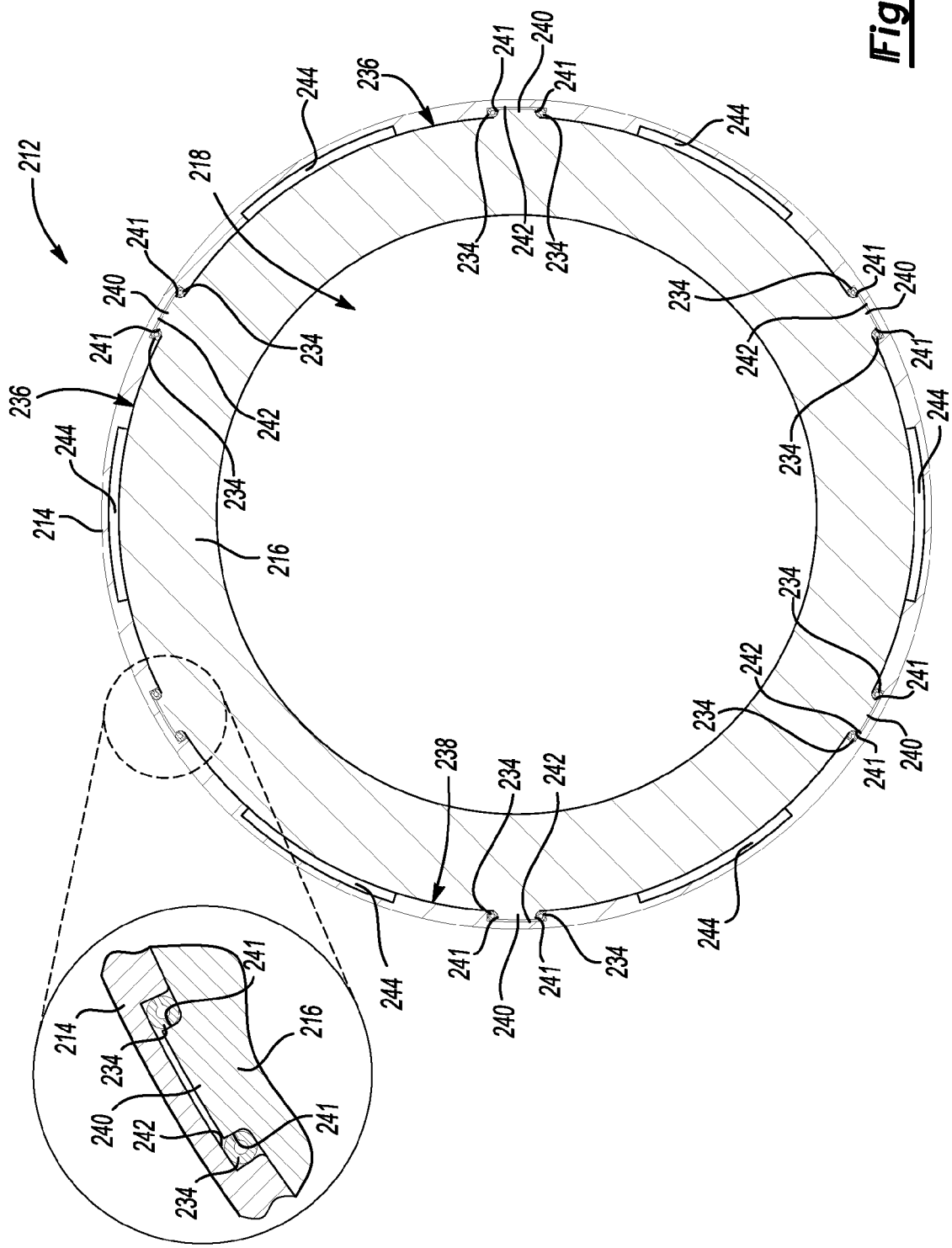
FIG. 4 is a schematic illustration in cross-sectional end view of a third embodiment of an electric motor assembly.

Referring to FIG. 4, another embodiment of an electric motor assembly 212 includes a stator 216 slip-fit within an interior cavity 218 of a motor housing 214, which may also be a transmission housing. The motor housing 214 is a die cast aluminum alloy or, alternatively, magnesium alloy or plastic. The stator 216 is a glued stack of punched silicon steel laminations. The rotor is not shown. Pockets or slots 244 are cast into the housing 214 to allow cooling oil flow along an outer surface 236 of the stator 216. The stator 216 is provided with a first set of geometric features in the form of square-sided teeth 240 with quarter-round roots 241 stamped or pressed into the outer surface 236 of the stator 216. Likewise, the housing 214 is provided with a second set of features in the form of slots 242 molded, broached or milled at the inner surface 238 (i.e., the inner bore) of the housing 214. The stator 216 is press-fit into the housing 214 so that the teeth 240 are aligned with the slots 242. Pairs of roll pins 234 are inserted between the housing 214 and stator 216 into small cavities formed at the aligned teeth 240 and slots 242, with a roll pin 234 on either side of each tooth 240 between the flat side of the tooth 240 and the stator 214 at the slot 242, so that the roll pins 234 are in rolling contact with the tooth and the stator 214 at the slot 242. Any type of roll pin may be used, with the roll pins 234 characterized by a size and a spring force that will maintain contact with the housing 214 and stator 216 over the expected range of thermal expansion. Alternatively, the slots 244 may be eliminated if the slots 242 are appropriately sized to allow sufficient cooling oil flow along the outer surface 236 of the stator 216.

Figure 5:
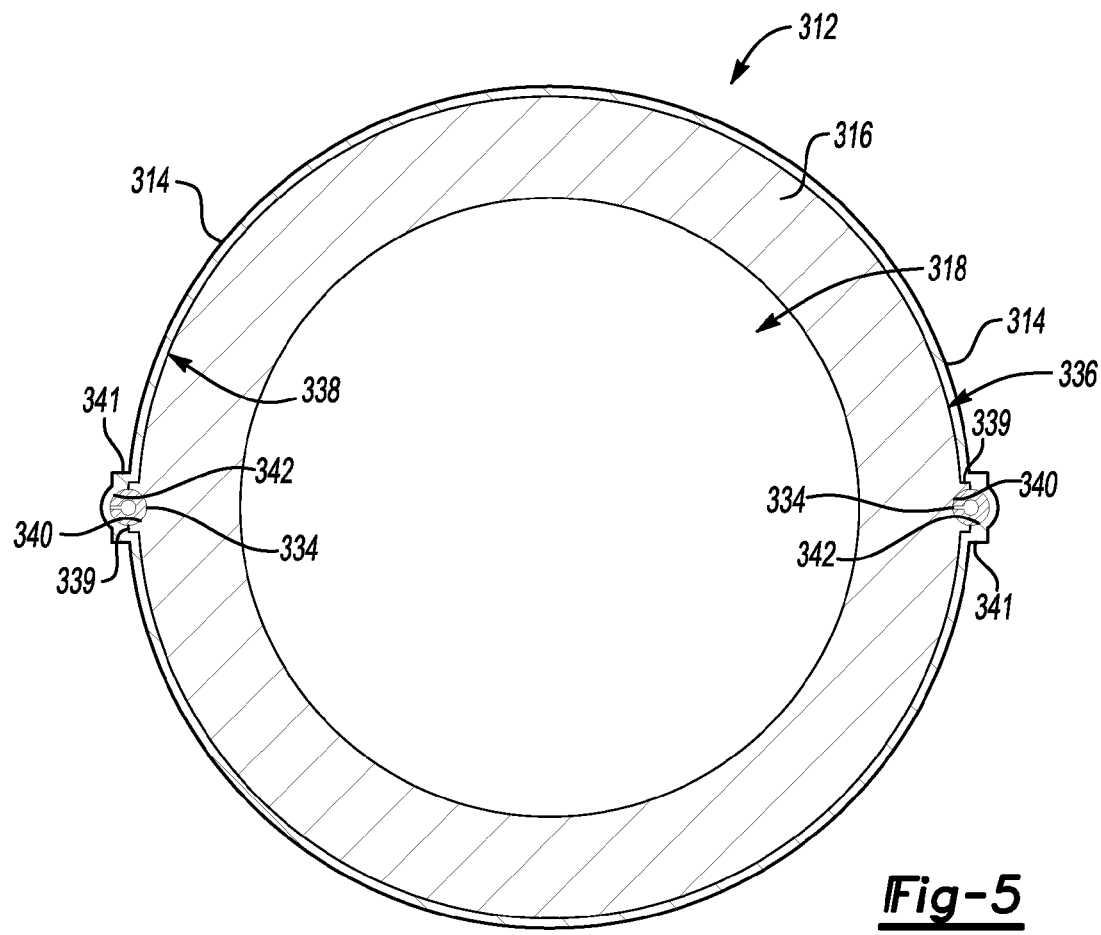
FIG. 5 is a schematic illustration in cross-sectional end view of a fourth embodiment of an electric motor assembly.

Referring to FIG. 5, in another embodiment of an electric motor assembly 312, a stator 316 is slip fit within an interior cavity 318 of a motor housing 314, which is also a transmission housing. The stator 316 is a glued stack of punched silicon steel laminations. The rotor is not shown. The motor housing 314 is a die cast aluminum alloy or, alternatively magnesium alloy or plastic. Unlike the embodiment of FIG. 4, there are no slots cast into the housing 314, in order to minimize the overall size of the housing 314. The geometric features provided in the stator 316 and housing 314 are also configured to maintain a small overall size. Specifically, the stator 316 is provided with a first set of geometric features in the form of extensions or "bump-outs" 339 with half-round notches 340 stamped or pressed into the outer surface 336 of the stator 316. Likewise, the housing 314 is provided with a second set of features in the form of extensions 341 or "bump-outs" with half-round notches 342 broached or milled at the inside surface 338 (i.e., the inner bore) of the housing 314. The stator 316 is press-fit into the housing 314 so that the extensions 339, 341 and notches 340, 342 are aligned, with roll pins 334 inserted between the housing 314 and stator 316 into small cavities formed at the aligned notches 340, 342. Any type of roll pin may be used, with the roll pins 334 characterized by a size and with a spring force that will maintain contact with the housing 314 and stator 316 over the expected range of thermal expansion.

Accordingly, the electric motor assemblies 12, 112, 212 and 312 described above may be assembled according to a method, described with respect to the electric motor assembly 12 of FIG. 1, that includes configuring (e.g., stamping or pressing) an annular stator 16 with a plurality of first geometric features (e.g., grooves 40) on an outer surface 36 of the stator 16. The method includes configuring (e.g., broaching, milling or molding) a housing 14 with a plurality of second geometric features (e.g., grooves 42) on an inner surface 38 of the housing 14. The grooves 40 and 42 are aligned and the stator 16 is fit into the housing 14, and roll pins 34 are inserted between the stator 16 and housing 14 at the aligned grooves 40, 42. The stator 16 and housing 14 may be slip-fit with one another, or may have a light press-fit or a heat-shrink-fit. The roll pins 34 may be inserted into the aligned grooves 40, 42 after the stator 16 is otherwise positioned into the housing 14, to allow each roll pin 34 to be pressed to a chosen axial location along the respective grooves 40, 42, especially if the roll pin is shorter in axial length than the stator 16, as shown in FIG. 1.

While the best modes for carrying out the invention have been described in detail, those familiar with the art to which this invention relates will recognize various alternative designs and embodiments for practicing the invention within the scope of the appended claims.

The invention claimed is:

1. An electric motor assembly in a vehicle powertrain, comprising:
   a motor housing having an inner surface and defining an interior cavity within the powertrain;
   a generally annular stator fit within the cavity and having an outer surface facing the inner surface of the motor housing radially outward of the inner surface;
   a plurality of roll pins fit radially between the inner surface of the housing and the outer surface of the stator and not within the stator; wherein the roll pins are configured to expand and contract to maintain contact with both the motor housing and the stator during thermal expansion of the motor housing and stator;
   wherein the stator has a plurality of first geometric features at the outer surface; wherein the housing has a plurality of second geometric features at the inner surface; wherein the first geometric features are configured to align radially with the second geometric features when the stator is fit within the cavity; wherein the roll pins are fit between the housing and the stator at the aligned first and second geometric features;
   wherein the first geometric features are a set of teeth spaced about the outer surface of the stator; wherein the second set of geometric features are a set of slots spaced about the inner surface of the housing; wherein the teeth align with the slots to define a plurality of cavities; and wherein a different pair of the roll pins is fit in each cavity with the roll pins of each different pair on opposing sides of a respective one of the teeth.

2. The electric motor assembly of claim 1, wherein the motor housing is a first material having a first rate of thermal expansion; and wherein the stator is a second material having a second rate of thermal expansion.

3. The electric motor assembly of claim 1, wherein the slots are configured for distributing cooling oil along the outer surface of the stator.

4. The electric motor assembly of claim 1, wherein the housing is a nonferrous material and the stator is steel.

5. The electric motor assembly of claim 1, wherein the powertrain includes a transmission; and wherein the motor housing is a transmission housing.

6. A method of assembling an electric motor with a housing of a vehicle powertrain, comprising:
   configuring an annular stator with a plurality of first geometric features on an outer surface of the stator and not within the stator;
   configuring the housing with a plurality of second geometric features on an inner surface of the housing radially outward of and facing the inner surface;
   aligning the first geometric features with the second geometric features;
   press-fitting the annular stator into the housing;
   inserting a respective roll pin between the stator and the housing at the respective aligned features; wherein the respective roll pins are configured to expand and contract to maintain contact with both the motor housing and the stator during thermal expansion of the motor housing and stator;
   wherein the first geometric features are a set of teeth spaced about the outer surface of the stator; wherein the second set of geometric features are a set of slots spaced about the inner surface of the housing; wherein the teeth align with the slots to define a plurality of cavities; and wherein a different pair of the roll pins is inserted in each cavity with the roll pins of each different pair on opposing sides of a respective one of the teeth.

7. The method of claim 6, wherein said configuring an annular stator is by one of stamping or pressing the first geometric features.

8. The method of claim 6, wherein said configuring a housing is by one of molding, broaching or milling the second geometric features.

9. An electrically-variable transmission comprising:

a transmission housing having an inner surface and defining an interior cavity;

an electric motor/generator having a stator with an outer surface facing the inner surface of the transmission housing radially outward of the inner surface; wherein the stator is press-fit to the transmission housing within the interior cavity;

a plurality of roll pins supported by the transmission housing and stator between the inner surface of the transmission housing and the outer surface of the stator and not within the stator; wherein the transmission housing and the stator are characterized by different rates of thermal expansion; wherein the roll pins are configured to maintain contact with the housing and the stator over a predetermined gap distance between the stator and housing caused by the different rates of thermal expansion;

wherein the stator has a plurality of first geometric features at the outer surface; wherein the housing has a plurality of second geometric features at the inner surface; wherein the first geometric features are configured to align radially with the second geometric features when the stator is fit within the cavity; wherein the roll pins are fit between the housing and the stator at the aligned first and second geometric features;

wherein the first geometric features are a set of teeth spaced about the outer surface of the stator; wherein the second set of geometric features are a set of slots spaced about the inner surface of the housing; wherein the teeth align with the slots to define a plurality of cavities; wherein a different pair of the roll pins is fit in each cavity with the roll pins of each different pair on opposing sides of a respective one of the teeth.

10. The electric motor assembly of claim 1, wherein the aligned first and second features form cavities for distributing cooling oil along the outer surface of the stator; wherein the stator has a stator coil; and further comprising:

a stator support forming a chamber in fluid communication with at least one of the cavities and having at least one opening positioned to permit cooling oil flow from the at least one of the cavities to the stator coil.

* * * * *